US007003394B2

(12) United States Patent
Takahashi et al.

(10) Patent No.: US 7,003,394 B2
(45) Date of Patent: Feb. 21, 2006

(54) ENGINE CONTROLLER

(75) Inventors: Tomohiro Takahashi, Kariya (JP); Koji Ishizuka, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/047,678

(22) Filed: Feb. 2, 2005

(65) Prior Publication Data

US 2005/0171678 A1 Aug. 4, 2005

(30) Foreign Application Priority Data

Feb. 4, 2004 (JP) ............................ 2004-027501

(51) Int. Cl.
*G06F 7/00* (2006.01)
*F02D 41/00* (2006.01)

(52) U.S. Cl. ..................................................... 701/104

(58) Field of Classification Search ................ 701/104, 701/103, 102; 477/154, 156

See application file for complete search history.

(56) References Cited

U.S. PATENT DOCUMENTS 6,254,512 B1 * 7/2001 Minowa et al. ............. 477/156
6,286,914 B1 * 9/2001 Sawada et al. .......... 303/113.2

FOREIGN PATENT DOCUMENTS

JP 8-296470 11/1996
JP 2002-256945 A * 9/2002
JP 2002-317681 10/2002
JP 2003-254140 A * 9/2003

* cited by examiner

*Primary Examiner*—Hieu T. Vo
(74) *Attorney, Agent, or Firm*—Nixon & Vanderhye P.C.

(57) ABSTRACT

An engine controller controls an injection quantity or intake airflow supplied to a cylinder of an engine. Constant associated with e running resistance of the vehicle are reconfigured according to vehicle specifications when a change is made to the vehicle specifications. A target acceleration is determined from the accelerator operation amount. An acceleration resistance is determined using the target acceleration and a constant based on the vehicle weight. At least an air resistance and a rolling resistance are added to the acceleration resistance to determine a running resistance for accelerating or decelerating the vehicle at the target acceleration. A driving wheel torque is determined using the running resistance and a constant based on the effective tire radius. An engine output shaft torque equivalent to a driver-requested torque is determined using the driving wheel torque and a constant based on the final gear ratio.

14 Claims, 4 Drawing Sheets

ENGINE CONTROLLER

CROSS REFERENCE TO RELATED APPLICATIONS

This application is based upon and claims the benefit of priority of Japanese Patent Application No. 2004-27501, filed on Feb. 4, 2004, the contents of which are incorporated herein by reference.

FIELD OF THE INVENTION

The present invention relates to an engine controller that variably controls an injection quantity or an intake airflow supplied to an engine based on a driver-requested torque calculated in accordance with a driver's accelerator operation.

BACKGROUND OF THE INVENTION

A conventional engine controller uses a governor pattern map to determine a directed governor pattern injection quantity based on an accelerator operation amount (accelerator opening) and an engine speed. Japanese Patent document JP-A No. 296470/1996 at pages 1 to 15 and FIGS. 1 to 10 discloses an engine controller controlling an injection quantity based on the directed governor pattern injection quantity. When the engine is accelerated, the engine controller calculates a directed acceleration correcting injection quantity based on a previously calculated directed basic injection quantity. Based on the directed acceleration correcting injection quantity, the engine controller controls the injection quantity to prevent variations in output torque of an engine shaft.

Another conventional engine controller calculates an engine output shaft torque (i.e., driver-requested torque) requested by a driver based on the accelerator operation amount and the engine speed. Japanese Patent document JP-A No. 317681/2002 at pages 1 to 6 and FIGS. 1 to 7 discloses an engine controller controlling either intake airflow or an injection quantity based on the driver-requested torque. Even when the engine warms up during cold startup or idles high due to external load operations such as an air conditioner, the accelerator operation amount is corrected using an offset map that includes correction amounts for the accelerator operation amount plotted against target revolution speeds during an idle operation. Even when the driver's accelerator operation amount is 0, the driver-requested torque never indicates a negative value. The engine idle speed after an increase in the idle is maintained.

The governor pattern described in JP-A No. 296470/1996 identified above identifies balancing characteristics between the engine speed and the accelerator opening for establishing a static engine output shaft torque. The governor pattern makes it impossible to directly achieve an intended parameter (target speed or acceleration). For example, there is a problem in requiring many steps compliant with drivability (steady and smooth driving performance or accelerating/decelerating driving performance) and increasing costs.

The engine controllers described above fail to provide one-to-one correspondence between physical phenomena such as vehicle specifications and stored data such as the governor pattern, control logic, or a control program. When a change is made to vehicle specifications such as the vehicle weight, the effective tire radius, the final change gear ratio, the air pressure coefficient, the frontal projected area, and/or the tire rolling resistance coefficient, it follows that a running resistance, a wheel (driving wheel) torque, and the engine output shaft torque also change. It is difficult to modify the stored data such as the governor pattern, the control logic, and the control program in view of these changes.

During a steady operational state, a change in the driver's accelerator operation amount is smaller than or equal to a specified value. The steady state may be defined by the driver driving at a constant target speed along a flat road. In a transient state, a change in the driver's accelerator operation amount is greater than or equal to the specified value. The transient state can be defined by the driver accelerating or decelerating at a target acceleration on a flat road.

As mentioned above, there may be a case where a driver-requested engine output shaft torque (i.e., driver-requested torque) is calculated based on the driver's accelerator operation amount. In such a case, it is desirable to calculate the torque while considering a running resistance and the vehicle specifications. Running resistance is generated when vehicles travel along roads due to the tires (driving wheels) contacting the road surface. Considering this makes it possible to achieve the driver-requested torque and the wheel (driving wheel) torque corresponding to the driver's accelerator operation amount. The vehicle is requested to travel at a target speed or a target acceleration smoothly and without passenger discomfort. For this purpose, it is desirable to calculate the driver-requested torque using correction amounts that take into consideration the running resistance, the wheel (driving wheel) torque, and the final gear ratio, which vary with changes in the vehicle specifications.

Vehicles of the same car model may be additionally equipped with, for example, aero parts, an air conditioning system, na electrically operated sunroof, a navigation system, parts compliant with cold region specifications, dealer installed optional parts, or other accessory drive devices. In such a case, the vehicle weight, which is a constant vehicle specification, is changed.

The above-mentioned running resistance is broadly categorized into air resistance, rolling resistance, hill-climbing resistance, and acceleration resistance. During constant travel on a flat road, the running resistance results from the sum of the air resistance and the rolling resistance. During travel along a slope, the hill climbing resistance is added. During acceleration and/or deceleration, the acceleration resistance is added.

In the above description, the air resistance is calculated based on a vehicle speed (V) detected by a vehicle speed sensor, an air resistance coefficient, and a frontal projected area uniquely predetermined by the vehicle specifications. The acceleration resistance is calculated based on a vehicle acceleration ($\alpha V$) determined by differentiating the vehicle speed (V) detected by the vehicle speed sensor and a vehicle weight (W) uniquely predetermined by vehicle specifications.

When a change is made to a vehicle specification (vehicle weight, effective tire radius, final change gear ratio, air pressure coefficient, frontal projected area, tire rolling resistance coefficient), the running resistance, the wheel (driving wheel) torque, and the engine output shaft torque change. In the event of these changes, it is difficult to modify the stored data, the control logic, and/or the control program in the engine controller.

SUMMARY OF THE INVENTION

It is an object of the present invention to provide an engine controller capable of easily and appropriately allowing an intended parameter to comply with a driver-requested torque by defining a direct correspondence between a physical feature such as vehicle specifications and a control logic or a control program. It is another object of the present invention to provide an engine controller capable of easily modifying a control logic or a control program to comply with a change in running resistance, wheel (driving wheel) torque, or engine output shaft torque simply by changing one or more constants based on vehicle specifications even when a change is made to the vehicle specifications associated with an increase or a decrease in the vehicle's running resistance.

Accordingly, one aspect of the present invention enables a driver to vary an accelerator operation amount and initiate a transient state. This state is defined to be a state where the driver seeks to establish acceleration or deceleration at a specified rate. In consideration for this, a target acceleration is determined from the driver's accelerator operation amount. An acceleration resistance is determined based on the target acceleration and a constant based on the vehicle weight. At least an air resistance and a rolling resistance are added to the acceleration resistance to determine a running resistance for the accelerating or decelerating travel of the vehicle at the target acceleration. A wheel (driving wheel) torque is determined based on the determined running resistance and a constant based on the effective tire radius. An engine output shaft torque that is equivalent to the driver-requested torque is determined using the determined wheel (driving wheel) torque and a constant based on the final gear ratio.

Even when a change is made to vehicle specifications associated with an increase or a decrease in vehicle's running resistance, the controller needs to only reconfigure one or more constants based on the vehicle specifications such as the vehicle weight, the effective tire radius, or the final gear ratio. Simply doing so can easily modify a control logic or a control program due to a change in running resistance, wheel (driving wheel) torque, or engine output shaft torque equivalent to the driver-requested torque after changing the vehicle specifications. It is possible to create a direct correspondence between a physical feature such as the vehicle specifications and the control logic or the control program. This makes it possible to easily and appropriately provide compliance between intended parameters (driver's accelerator operation amount and target acceleration) and the driver-requested torque. The driver may change the accelerator operation amount for accelerating or decelerating the vehicle based on a target acceleration. In such a case, it is possible to decrease the number of compliance steps to achieve drivability (accelerating/decelerating driving performance) in accordance with a change in the accelerator operation amount caused by the driver.

According to another aspect of the present invention, a target running speed is determined from the driver's accelerator operation amount. The target running speed can be time-differentiated to determine the target acceleration. According to another aspect of the present invention, multiplying the target acceleration by a constant based on the vehicle weight enables the controller to determine an acceleration resistance during acceleration or deceleration of the vehicle at the target acceleration.

According to yet another aspect of the present invention, the driver may not change the accelerator operation amount. This state is defined to be a state where the driver seeks to travel at a constant running speed. In consideration for this, a target running speed is determined from the driver's accelerator operation amount. An air resistance is determined based on the determined target running speed, a constant based on the air resistance coefficient, and a constant based on the frontal projected area. At least a rolling resistance is added to the air resistance to determine a running resistance corresponding to the constant running of the vehicle at the target running speed. A wheel (driving wheel) torque is determined based on the running resistance and a constant based on the effective tire radius. An engine output shaft torque equivalent to the driver-requested torque is determined based on the determined wheel (driving wheel) torque and a constant based on the final gear ratio.

Even when a change is made to one of the vehicle specifications to effect an increase or a decrease in the vehicle's running resistance, the controller only needs to reconfigure one or more constants based on the vehicle specifications such as the air resistance coefficient, the frontal projected area, the effective tire radius, or the final gear ratio. Simply doing so can easily modify a control logic or a control program for determining a change in running resistance, wheel (driving wheel) torque, or engine output shaft torque equivalent to the driver-requested torque after changing the vehicle specifications. It is possible to define a direct correspondence between a physical feature such as the vehicle specifications and the control logic or the control program. This makes it possible to easily and appropriately provide compliance between intended parameters (driver's accelerator operation amount and target running speed) and the driver-requested torque. The driver may not change the accelerator operation amount for constant running of the vehicle at a constant target running speed. In such a case, it is possible to decrease the number of compliance steps for drivability (constant running feel) in accordance with the driver's accelerator operation amount.

According to yet another aspect of the present invention, it is possible to determine the air resistance during constant running of the vehicle at a target running speed by squaring the target running speed and multiplying a result by a constant based on the frontal projected area, the air resistance coefficient, and an air density. According to another aspect of the present invention, a specified correcting ratio is used to correct the target running speed. It is possible to set the target speed capable of following from the current running speed (vehicle speed) to the next time to improve the accuracy of calculating the air resistance during transient running of the vehicle on flat roads. According to yet another aspect of the present invention, a rolling resistance can be determined by multiplying a constant based on the vehicle weight by a road frictional coefficient and gravitational acceleration.

According to yet another aspect of the present invention, the driving wheel torque can be determined by multiplying the running resistance by a constant based on the effective tire radius. According to yet another aspect of the present invention, the wheel (driving wheel) torque is determined for considering a feedback correction amount corresponding to a deviation between an engine speed and a target revolution speed during idling. It is possible to determine an optimum wheel (driving wheel) torque requested by the driver even during idling, i.e., when the driver's accelerator operation amount is 0. The engine output shaft torque can be determined by dividing the determined wheel (driving wheel) torque by the gear ratio. According to yet another aspect of the present invention, the engine output shaft torque can be determined by dividing the driving wheel torque by a constant based on the final gear ratio.

According to a further aspect of the present invention, the controller has storage device for storing relationships between the engine output shaft torque and an injection quantity or an intake airflow supplied to the engine's cylinder based on map data or calculation formula data. The engine output shaft torque to be calculated by the transmission output shaft torque calculator may be converted into an injection quantity or an intake airflow based on the map data or the calculation formula data stored in the storage device.

According to a yet further aspect of the present invention, the engine controller according to the present invention may be applied to a diesel engine controller (diesel engine control system) that controls an injection quantity to be injected into a cylinder of a diesel engine mounted on the vehicle, a fuel injection timing, or a fuel injection pressure based on an engine output shaft torque equivalent to the driver-requested torque.

Other features and advantages of the present invention will be appreciated, as well as methods of operation and the function of the related parts from a study of the following detailed description, appended claims, and drawings, all of which form a part of this application. In the drawings:

DETAILED DESCRIPTION OF THE PREFERRED EMBODIMENTS

Figure 1:
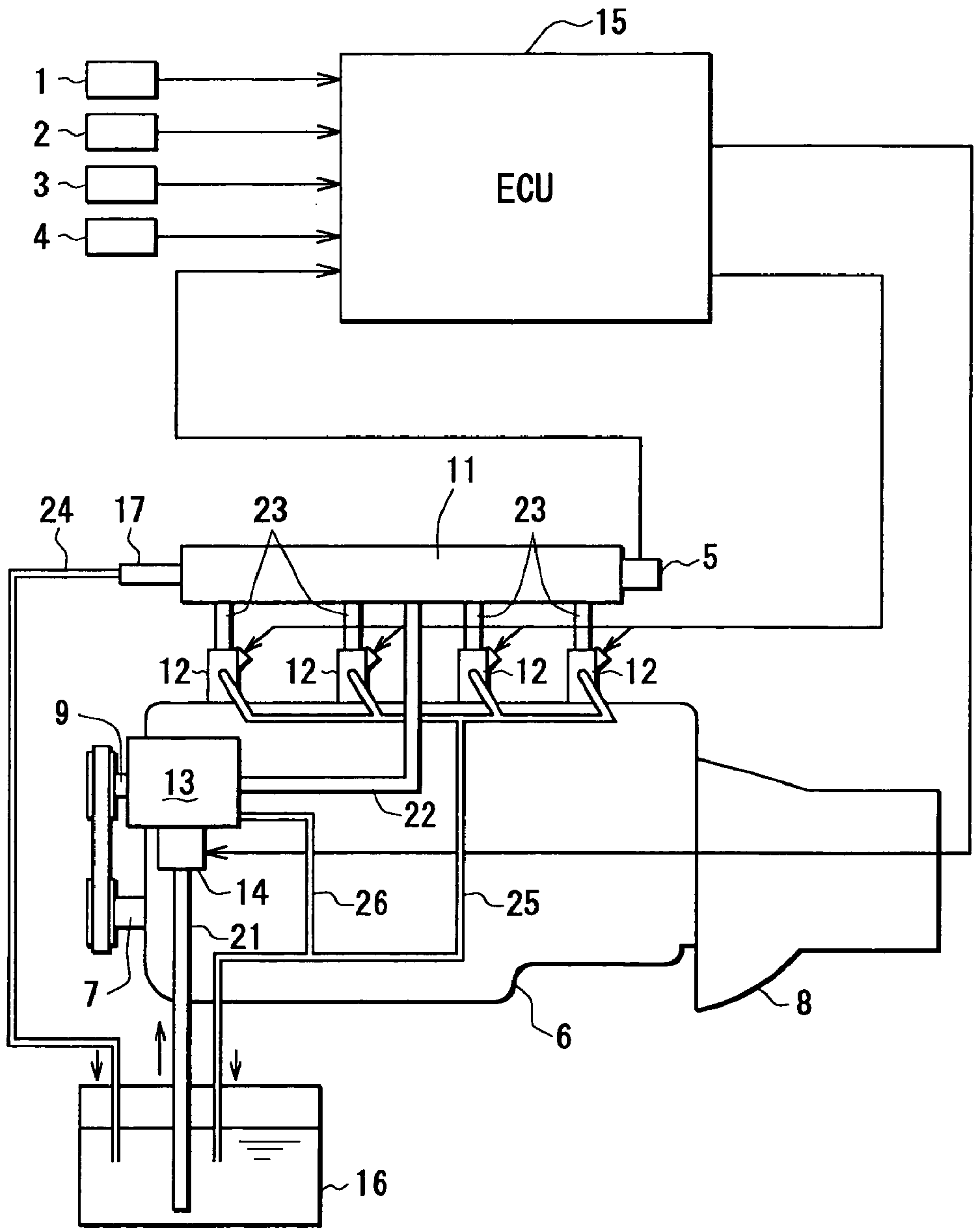
FIG. 1 is a schematic diagram of a common rail fuel injection system according to the present invention.

FIGS. 1 through 4 illustrate a preferred embodiment of the present invention. FIG. 1 diagrams the overall construction of a common rail fuel injection system.

The fuel injection system for internal combustion engines according to this embodiment is a diesel engine controller (diesel engine control system) mounted on a vehicle such as a car. The system calculates a-driver-requested torque based on an operator's (driver's) accelerator operation amount detected by an accelerator opening sensor 1. Based on the calculated driver-requested torque, the system controls the injection quantity to be injected into a combustion chamber for each cylinder of an internal combustion engine (hereafter referred to as an engine 6) such as a multi-cylinder diesel engine mounted on the vehicle. The engine control system according to the embodiment is a common rail fuel injection system (fuel injection system using accumulated pressure) generally known as a fuel injection system for diesel engines. The system is constructed to inject high-pressure fuel accumulated in a common rail 11 into the combustion chamber for each cylinder of the engine 6 via a plurality of fuel injection valves (injectors) 12 mounted correspondingly to the cylinders of the engine 6.

The common rail fuel injection system includes the common rail 11, a plurality of injectors 12, a fuel supply pump 13, and an engine control unit 15 (ECU). The common rail 11 accumulates high-pressure fuel to a fuel injection pressure. The plurality of injectors 12 (four injectors in this example) inject fuel into a combustion chamber of each cylinder in the engine 6 at a specified injection timing. The fuel supply pump (supply pump) 13 works with a suction fuel control system to highly pressurize fuel taken into a pressurizing chamber via an intake metering valve (SCV) 14. The engine ECU 15 electronically controls electromagnetic valves (not shown) of the injectors 12 and the intake metering valve 14 of the supply pump 13.

An output shaft (hereafter referred to as a crankshaft 7) of the engine is coupled to an input shaft of an automatic transmission serving as the transmission system via a torque converter (not shown) serving as the automatic clutch mechanism. The transmission system transmits rotational power of the engine 6 to a drive axle (drive shaft) and drive wheels. The automatic transmission (hereafter referred to as a transmission 8) according to the embodiment has multiple forward transmission gears and converts a rotational speed of the engine 6 into a specified gear ratio. In an alternative embodiment, it may be preferable to use a manual transmission as the transmission system.

The common rail 11 is connected to a discharge port of the supply pump 13 for discharging high-pressure fuel via a fuel supply pipe 22. A pressure limiter 17 is attached to a relief pipe (fuel-recirculating pipe) 24 from the common rail 11 to a fuel tank 16. When the fuel pressure in the common rail 11 exceeds a critical pressure, the pressure limiter opens to limit the fuel pressure in the common rail 11 to a pressure below the critical pressure. The plurality of injectors 12 are mounted to the corresponding cylinders of the engine 6 and are connected to downstream ends of a plurality of fuel supply pipes (branch pipes) 23 branching from the common rail 11. The injector 12 is an electromagnetic fuel injection valve mainly including a fuel injection nozzle, an electromagnetic valve, and a needle actuator. The fuel injection nozzle injects fuel into the combustion chamber for each cylinder of the engine 6. The electromagnetic valve drives a nozzle needle housed in the fuel injection nozzle toward an opening direction. The needle actuator (not shown) such as a spring actuates the nozzle needle toward the opening direction.

The injector 12 for each cylinder injects fuel into the combustion chamber for each cylinder of the engine 6. The system electronically controls the fuel injection by energizing and de-energizing (turning power ON/OFF) a solenoid coil of the electromagnetic valve. The electromagnetic valve controls an increase or decrease in the fuel pressure in a backpressure control chamber that controls operations of a command piston interlocking with the nozzle needle. That is, the system energizes the solenoid coil of the electromagnetic valve of the injector 12. The nozzle needles open a plurality of injection holes formed at the tip of a nozzle body. During this time, the high-pressure fuel accumulated in the common rail 11 is injected into the combustion chamber for each cylinder of the engine 6. The engine 6 is operated in this manner. The injector 12 is provided with a leak port that leaks excess fuel or the fuel exhausted from the backpressure control chamber to a low-pressure side of the fuel system. The fuel leaked from the injector 12 is returned to the fuel tank 16 via a fuel-recirculating pipe 25.

The supply pump 13 is a high-pressure supply pump provided with two or more pressure feed systems (pump elements) that pressurize inlet low-pressure fuel to a high pressure and pressure-feeds the fuel into the common rail 11. The supply pump 13 uses one intake metering valve 14 to meter the intake fuel quantity and control the fuel discharge quantity of all the pressure feed systems. The supply pump 13 includes a feed pump, a cam, a plurality of plungers, and a pressurizing chamber. The feed pump is a known feed pump (low pressure supply pump, not shown) that pumps low pressure fuel from the fuel tank 16 when the crankshaft 7 of the engine 6 rotates to rotate a pump drive axle (drive shaft or cam shaft) 9. The cam (not shown) is rotatively driven by the pump drive axle 9. The plurality of plungers are driven by the cam and reciprocate between a top dead center and a bottom dead center. The plurality of pressurizing chambers (plunger chambers, not shown) pressurize fuel to a high pressure due to the reciprocating motion of the plungers.

When the low pressure fuel is taken from the fuel tank 16 into the pressurizing chambers via the fuel supply pipe 21, the supply pump 13 pressurizes the fuel to a high pressure by allowing the plunger to slidingly reciprocate in the pump cylinder. A fuel filter (not shown) is provided in the middle of the fuel supply pipe 21. The supply pump 13 is provided with a leak port to prevent the inside fuel from rising to a high temperature. The fuel leaked from the supply pump 13 is returned to the fuel tank 16 via the fuel-recirculating pipe 26. A fuel intake path (not shown) is formed in the supply pump 13 from the feed pump to the pressurizing chamber. The intake metering valve 14 is provided in the middle of the fuel intake path to adjust a ratio of a valve opening (valve lift amount or valve hole area) for the fuel intake path.

The ECU 15 uses a pump drive circuit (not shown) to apply a pump drive current (pump drive signal) to electronically control the intake metering valve 14. In this manner, the intake metering valve 14 adjusts the amount of fuel taken into the pressurizing chamber of the supply pump 13 to control the amount of fuel discharged into the common rail 11 from the pressurizing chamber of the supply pump 13. The intake metering valve 14 adjusts the amount of fuel discharged into the common rail 11 from the pressurizing chamber of the supply pump 13 in proportion to the magnitude of pump drive current applied to the solenoid coil. That is, the intake metering valve 14 changes a so-called common rail pressure. This is a fuel pressure in the common rail 11 equivalent to the injection pressure of the fuel to be injected from the injector 12 into the combustion chamber for each cylinder of the engine 6.

The ECU 15 according to this embodiment contains a microcomputer, an injector drive circuit (EDU), and a pump drive circuit. The microcomputer has a known structure including functions of a CPU for control and arithmetic processes, storage devices (memories such as ROM or EEPROM and RAM or standby RAM) to store various programs, control logic, control data, an input circuit, an output circuit, and a power supply circuit. The injector circuit (EDU) applies a pulsed injector drive current to the solenoid coil of the electromagnetic valve for the injector 12 of each cylinder. The pump drive circuit applies a pump drive current to the solenoid coil of the intake metering valve 14 for the supply pump 13.

Turning on an ignition switch (IG ON) supplies power to the ECU 15. Based on a control program stored in the memory, the ECU 15 is electronically controlled so that the injection quantity or the fuel injection pressure (common rail pressure) reaches a controlled value. Turning off the ignition switch (IG OFF) stops supplying power to the ECU 15. This forcibly terminates the above-mentioned control based on the control program stored in the memory or the control logic. An A/D converter converts the following signals from analog to digital: an output value (common rail pressure signal) from a fuel pressure sensor 5 provided in the common rail 11; sensor signals from the other sensors; and switch signals from switches provided in the vehicle. The converted signals are then input into the microcomputer of the ECU 15.

The microcomputer's input circuit mainly connects with the following sensors: an accelerator opening sensor 1 serving as a driving state sensor for detecting driving states and conditions of the engine 6, i.e., for detecting an operation amount (hereafter referred to as an accelerator opening: ACCP) equivalent to a pedaling degree of a driver's accelerator pedal (not shown); a crank angle sensor 2 for detecting a revolution angle of the crankshaft 7 of the engine 6; a cooling water temperature sensor 3 for detecting engine cooling water temperature (THW); and a fuel temperature sensor 4 for detecting fuel temperature (THF) at a pump intake into the supply pump 13. Of these sensors, the accelerator opening sensor 1 outputs an accelerator opening signal representative of the accelerator opening (ACCP).

The crank angle sensor 2 includes an electromagnetic pick-up coil provided facing an outside periphery of an NE timing rotor (not shown) attached to the crankshaft 7 of the engine 6 or the pump drive axle (drive shaft or cam shaft) 9 of the supply pump 13. An outside peripheral surface of the NE timing rotor is provided with a plurality of teeth located at every specified revolution angle. Each tooth of the NE timing rotor repeatedly approaches and departs from the crank angle sensor 2. Due to electromagnetic induction, the crank angle sensor 2 outputs a pulsed revolution position signal (NE signal pulse). In particular, the output NE signal pulse synchronizes with a revolution speed (engine speed) of the crankshaft 7 of the engine 6 and a revolution speed (pump revolution speed) of the supply pump 13. The ECU 15 functions as a revolution speed sensor for detecting an engine speed (hereafter referred to as an engine revolution: NE) by measuring time intervals of the NE signal pulse output from the crank angle sensor 2.

The ECU 15 is constructed to perform CAN communication (e.g., request to increase or decrease the current gear position or the engine output shaft torque, request for idle up, and the like) with a transmission control unit (TCM, not shown) and an air conditioning system. The TCM connects with the above-mentioned accelerator opening sensor 1 and a vehicle speed sensor (not shown) to detect a vehicle's running speed (hereafter referred to as a vehicle speed). The vehicle speed sensor embodies, for example, a reed switch vehicle speed sensor or a magnetic resistance element vehicle speed sensor. The vehicle speed sensor functions as vehicle speed sensor for measuring a revolution speed of a transmission output shaft for the transmission 8 and outputting a vehicle speed corresponding to the vehicle running speed (vehicle speed). As the vehicle speed sensor, it may be preferable to use a wheel speed sensor to detect vehicle's wheel speeds.

When a selection lever is positioned to a D-range or a 2-range, the TCM receives an accelerator opening signal corresponding to the accelerator opening (ACCP) from the accelerator opening sensor 1 and a vehicle speed signal corresponding to the vehicle speed (SPD) from the vehicle speed sensor. Based on these signals, the TCM changes hydraulic circuits by combining ON/OFF states of actuators such as transmission solenoid valves. The TCM selects a plurality of gear positions (the first to fourth gears for four gears forward or the first to fifth gears for five gears forward) to control transmission states of the transmission 8. In this manner, the transmission takes place. The vehicle specifications prescribe the transmission gear ratio (gear ratio) of the first to fourth gears or the first to fifth gears.

The ECU 15 has fuel pressure controller (common rail pressure controller). After the ignition switch is turned on (IG ON), the fuel pressure controller calculates an optimum common rail pressure corresponding to driving states or conditions of the engine 6 and drives the solenoid coil of the intake metering valve 14 for the supply pump 13 via the pump drive circuit. Fuel pressure calculator is provided to calculate a target common rail pressure (target fuel pressure: PFIN) using the engine revolution (NE) and a basic injection quantity (Q) or a directed injection quantity (QFIN). To achieve the target fuel pressure (PFIN), the system adjusts the pump drive current applied to the solenoid coil of the intake metering valve 14 to provide feed-back control over the fuel discharge quantity of the supply pump 13. That is, PI (proportional integral) control or PID (proportional integral and derivative) control is used to provide feed-back control over the fuel discharge quantity of the supply pump 13 so that a common rail pressure (PC) detected by the fuel pressure sensor 5 becomes approximately equivalent to the target fuel pressure (PFIN). Specifically, based on a pressure deviation (ΔP) between the common rail pressure (PC) detected by the fuel pressure sensor 5 and the target fuel pressure (PFIN), the system provides feedback control over a pump drive current (applied to the solenoid coil of the intake metering valve 14) correlated with the fuel discharge quantity of the supply pump 13.

The ECU 15 has calculates an optimum injection quantity and injection timing corresponding to driving states or conditions of the engine 6 and for driving the solenoid coil of the electromagnetic valve of the injector 12 for each cylinder via the injector drive circuit (EDU). Further, the ECU 15 has vehicle specifications administrator. The vehicle specifications affect an increase or decrease in the vehicle's running resistance. When the vehicle specifications are modified in constructing the vehicle, the vehicle specifications administrator can reconfigure one or more constants based on the vehicle specifications such as the vehicle weight, air resistance coefficient, frontal projected area, tire's rolling resistance coefficient, effective tire radius, and final gear ratio.

For example, there may be a case where a dealer installs an electrically operated sunroof, an air conditioning system, aero parts, a front grill guard, a headlamp, or other after market accessory on the vehicle. In another case, the vehicle specifications may be upgraded. In still another case, the vehicle may be built according to cold region specifications. In yet another case, the vehicle may be altered from a normal option version to an off-road option version or an urban option version. In still yet another case, the standard tire may be changed to one having a small or greater rolling resistance. In these cases, the vehicle specifications administrator changes constants based on the vehicle specifications. The vehicle specifications administrator replaces the constants with those based on the modified vehicle specifications and stores the constants in the memory (vehicle specifications storage device) such as EEPROM and standby RAM.

There may be various ways of rewriting the storage contents of the memory such as EEPROM or standby RAM. A volume control specially provided for service maintenance may be used to reconfigure the most recent version of constants based on the vehicle specifications. Changes in the vehicle specifications may be coded into numeric values (e.g., alphanumerics) such as car model codes and vehicle type numbers. A reader may be used to read the numeric data to reconfigure the most recent version of constants based on the vehicle specifications. Further, it may be preferable to simultaneously press two or more operation switches mounted on a vehicle's instrument panel or to press one or more operation switch for a long period of time so as to reconfigure the most recent version of constants based on the vehicle specifications. For example, an electronically controlled transmission is provided with an operation switch (e.g., a snow mode switch or a power mode switch) to change the transmission's shift points. Based on the switch operations, it may be preferable to change a road friction resistance coefficient ($\mu$) needed to calculate the air resistance out of the running resistances. That is, turning on the snow mode switch makes an assumption that the vehicle is to travel on snowy or icy roads. Turning off the snow mode switch makes an assumption that the vehicle is to travel on dry or paved roads. When the vehicle is equipped with a sensor to measure tire inflation pressures, it may be preferable to change a tire's rolling resistance coefficient (i.e., road friction resistance coefficient $\mu$) or an effective tire radius based on signals from the sensor.

Figure 2:
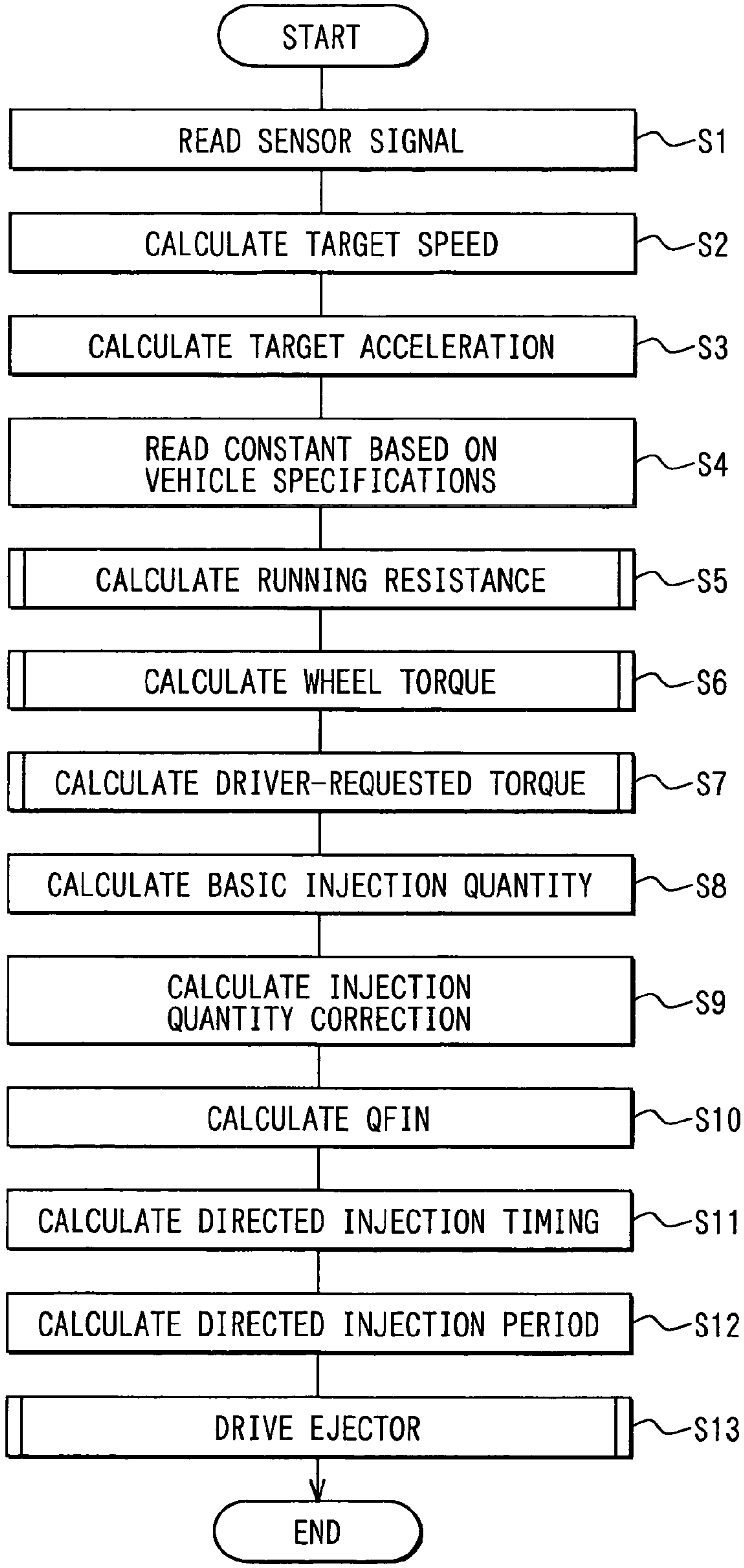
FIG. 2 is a flowchart of a control method for controlling the fuel injection system of FIG. 1 according to the principles of the present invention.

The following concisely describes the injection quantity control method according to the embodiment with reference to FIGS. 1 through 4. FIG. 2 is a flowchart showing the control method for the injector's injection quantity. After the ignition switch is turned on (IG ON), a main routine in FIG. 2 is executed at a specified timing. It may be preferable to calculate the quantity of fuel injected into the combustion chamber of each cylinder in the engine 6 for each of the cylinders in the engine 6 individually.

The system receives sensor signals from the various sensors (Step S1). Specifically, the system uses an accelerator opening signal received from the accelerator opening sensor 1 to calculate the accelerator opening (ACCP). The system measures a time interval of the NE signal pulse received from the crank angle sensor 2 to calculate the engine speed (NE). The system uses a common rail pressure signal from the fuel pressure sensor 5 to calculate the common rail pressure (PC).

The driver requests the accelerator opening (ACCP) as follows. The request is defined to determine a target running speed (hereafter referred to as a target speed) in the constant state where a change in the accelerator opening (ACCP) is smaller than or equal to a first specified value. The request is defined to determine a target acceleration in the transient state where a change in the accelerator opening (ACCP) is greater than or equal to a second specified value. For this purpose, the system first converts the accelerator opening (ACCP) into the target speed (target speed calculator: Step S2). The system then calculates the target acceleration by time-differentiating the target speed (target acceleration calculator: Step S3).

The system reads constants based on the vehicle specifications from the memory such as EEPROM or standby RAM (Step S4). The vehicle specifications are needed to calculate running resistances so that the vehicle can constantly run at a given speed or in an accelerating or decelerating mode at a given rate. For this purpose, the vehicle specifications include vehicle weight (m), air density (ρ), frontal projected area (overall area of the vehicle when viewed from the front: S), running resistance coefficient (air resistance coefficient, air drag coefficient, CD value: Cd) determined by the vehicle's total shape (e.g., body style), and tire's rolling resistance coefficient (i.e., road frictional resistance coefficient: $\mu$).

The vehicle specifications are also needed to calculate the engine output shaft torque based on the wheel (driving wheel) torque. For this purpose, the vehicle specifications include the final gear ratio (hereafter referred to as the transmission gear ratio or the gear ratio) resulting from multiplication of gear ratios for a plurality of transmission sections such as the transmission 8 and differential gears. The vehicle specifications are also needed to calculate the wheel torque from the running resistance. For this purpose, the vehicle specifications include the effective tire radius (hereafter referred to as the tire radius: r), i.e., the measurement from the tire center to the road surface after the tire flattens due to the vehicle weight. The vehicle specifications further include tire specification values (e.g., tire radius, tire width, and tire rubber hardness). In particular, adding or modifying parts on the vehicle surely changes the vehicle weight (m). The frontal projected area (S) and the running resistance coefficient (Cd) vary with parts such as aero parts and front grill guards that change the body style. When a dealer installs optional parts, the engine performance is presently not readjusted based on the vehicle specification changes, i.e., adding or modification of parts.

Figure 3:
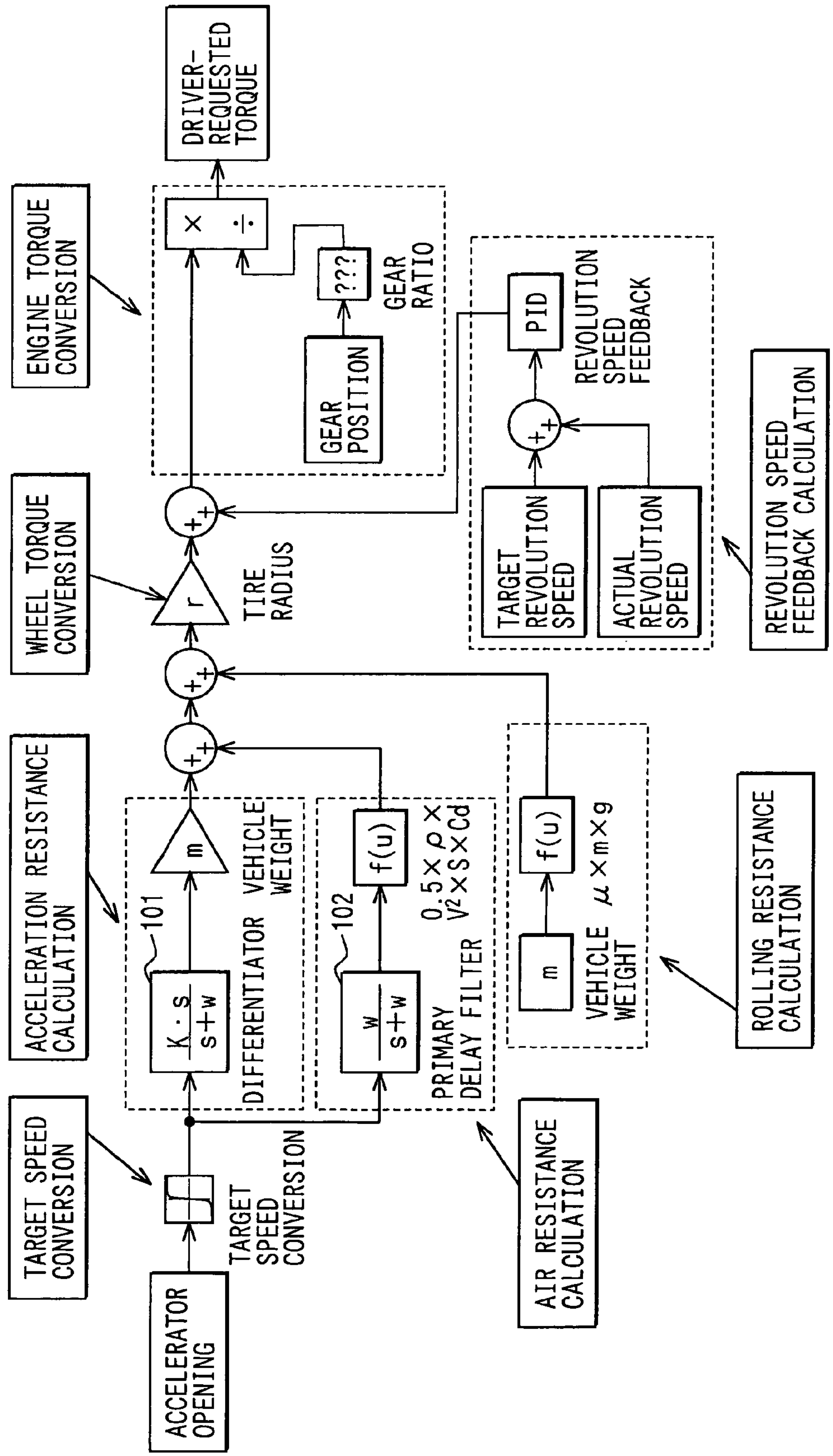
FIG. 3 is a flow diagram of a control logic of an engine control unit of the fuel injection system of FIG. 1 for calculating a driver-requested torque.
Figure 4:
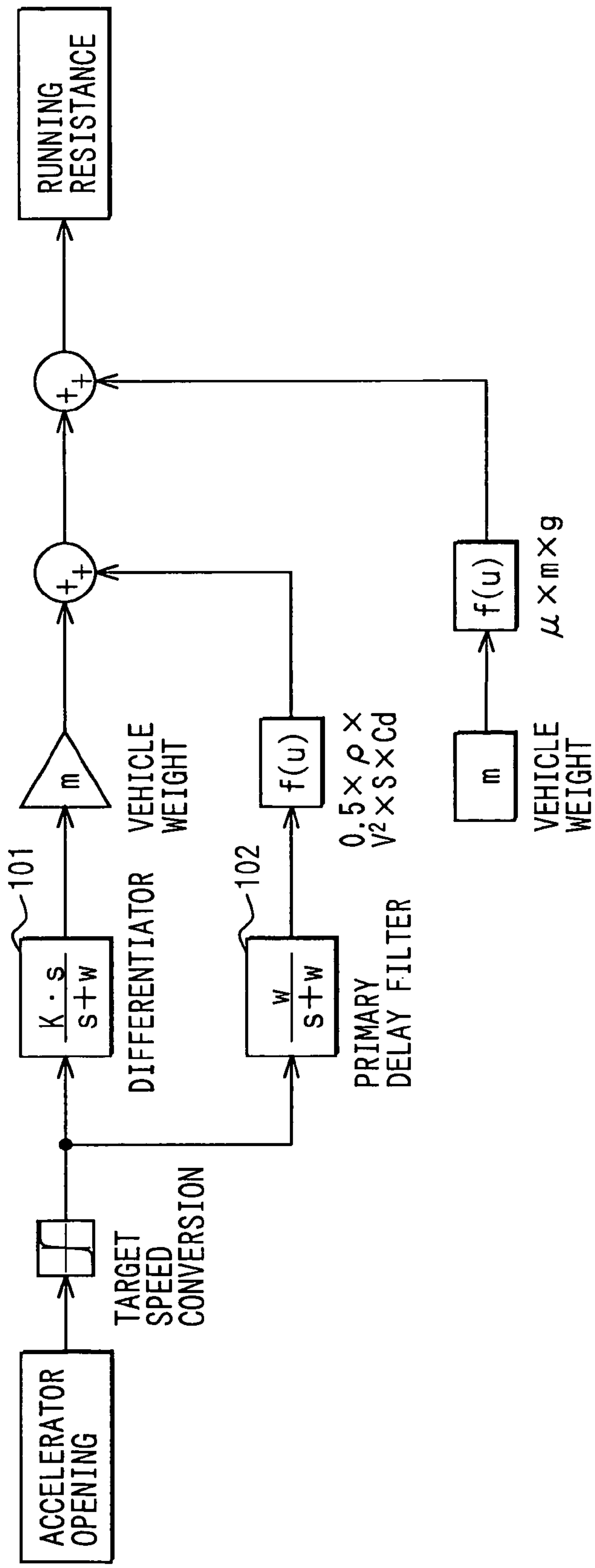
FIG. 4 is a flow diagram of a control logic of an engine control unit of the fuel injection system of FIG. 1 for calculating a running resistance.

Using control logics presented in FIGS. 3 and 4, the system calculates the running resistance from the target acceleration and the target speed (Step S5: running resistance calculator). The running resistance is applied to the vehicle when a driver-requested speed occurs. Using the control logic in FIG. 3, the system converts the running resistance into a wheel (driving wheel, drive axle, or axle) torque equivalent to the target drive axle (drive shaft) torque (driving wheel torque calculator: Step S6). Using the control logic in FIG. 3, the system converts the wheel torque into an engine output shaft torque (also referred to as a shaft torque) equivalent to the driver-requested torque (transmission output shaft torque calculator: Step S7).

The system then calculates the basic injection quantity (Q) from the driver-requested torque (Step S8). The system calculates the injection quantity correction amount (ΔQ) for the basic injection quantity (Q) from the engine cooling water temperature (THW), the fuel temperature (THF), and the like (correction amount calculator: Step S9). The injection quantity correction amount (ΔQ) may be calculated by using the known proportional integral (PI) control or proportional integral and derivative (PID) control. In this case, the system performs a feedback operation for the injection quantity correction amount (ΔQ) based on a vehicle speed deviation between the actual running speed (vehicle speed) detected by the vehicle speed sensor and the target speed or the corrected target speed. The system adds the basic injection quantity (Q) calculate at Step S8 to the injection quantity correction amount (ΔQ) calculated at Step S9 to determine the directed injection quantity (target injection quantity: QFIN) under normal control (Step S10).

The system calculates a directed injection timing (T) based on the engine speed (NE) and the directed injection quantity (QFIN) (Step S11). The system calculates an energizing time (injection pulse length, directed injection period: TQ) for the electromagnetic valve of the injector 12 based on the common rail pressure (PC) and the injection quantity (QFIN) (Step S12). The system uses the injector drive circuit (EDU) to apply a pulsed injector drive current to the solenoid coil of the electromagnetic valve for the injector 12 in each cylinder during a directed injection period (TQ) from the directed injection timing (T) (Step S13). Subsequently, the system exits from the main routine in FIG. 2.

The control logic in FIG. 3 shows the method of calculating a driver-requested torque used for the injector's injection quantity control based on the driver's accelerator operation amount. The control logic in FIG. 4 shows the method of calculating a running resistance based on the driver's accelerator operation amount.

As mentioned above, the ECU 15 converts the accelerator opening (ACCP) into the target speed, and then time-differentiates the target speed using a differentiator 101 to calculate the target acceleration (α). The ECU 15 reads the vehicle weight (m), one of the constants based on the vehicle specifications, from the memory such as EEPROM or standby RAM. The ECU 15 multiplies the calculated target acceleration (α) by the vehicle weight (m) to calculate the acceleration resistance (FA) for accelerated/decelerated running of the vehicle on flat roads (acceleration resistance calculator). In an alternative embodiment, it may be preferable to use the operational expression in equation 1 below to calculate the acceleration resistance (FA).

$$FA=\{(W+\Delta W)\times\alpha\}/g \qquad \text{Equation 1:}$$

wherein W is the vehicle weight (m), ΔW is the weight equivalent to a revolving part, α the target acceleration, and g the gravitational acceleration.

The ECU 15 uses a primary delay filter 102 to process the target speed and correct the target speed at a specified correcting ratio (correct a speed response of the target speed). In this manner, the ECU 15 sets the target speed capable of following from the current running speed (vehicle speed) to the next time. The ECU 15 reads constants based on the vehicle specifications from the memory such as EEPROM or standby RAM. Specifically, the ECU 15 reads the air density (ρ), the frontal projected area (S), and the running resistance coefficient (air drag coefficient, CD value: Cd). The ECU 15 calculates the air resistance (FD) for constant running of the vehicle on flat roads using the target speed (V) with the corrected response speed, the air density (ρ), the frontal projected area (S), the running resistance coefficient (Cd), and the operational expression in equation 2 below.

$$FD=0.5\times\rho\times V^2\times S\times Cd \qquad \text{Equation 2:}$$

The ECU 15 reads constants based on the vehicle specifications from the memory such as EEPROM or standby RAM. Specifically, the ECU 15 reads the vehicle weight (m) and the tire's rolling resistance coefficient (i.e., road frictional resistance coefficient: $\mu$). The ECU 15 calculates the rolling resistance (FR) for constant running of the vehicle on flat roads (rolling resistance calculator) using the vehicle weight (m), the road frictional resistance coefficient ($\mu$), the gravitational acceleration (g), and the operational expression in equation 3 below.

$$FR=\mu\times m\times g \qquad \text{Equation 3:}$$

When the vehicle is constantly running on a flat road, the ECU 15 adds the air resistance (FD) and the rolling resistance (FR) to calculate the running resistance (RR=FD+FR). When the vehicle is running on a flat road in accelerated/decelerated mode, the ECU 15 adds the acceleration resistance (FA) to the sum of the air resistance (FD) and the rolling resistance (FR) to calculate the running resistance (RR=FD+FR+FA) (running resistance calculator).

When the vehicle is climbing a hill, it may be preferable to add the hill climbing resistance (FS) to the sum of the air resistance (FD) and the rolling resistance (FR). The hill climbing resistance (FS) is calculated based on the operational expression in equation 4 below.

$$FS=W\times\sin(\theta) \qquad \text{Equation 4:}$$

wherein W is the vehicle weight (m) and θ the road inclination. The vehicle, when mounted with a navigation system, can read the road inclination (θ) from vehicle running points on a map. When the vehicle is equipped with an apparatus to detect or estimate the road inclination (θ), the vehicle can easily detect or estimate the road inclination (θ).

The ECU 15 reads the tire radius (r), one of the constants based on the tire specification values, from the memory such as EEPROM or standby RAM. The ECU 15 multiplies the calculated running resistance (RR) by the tire radius (r) to calculate the wheel torque (WDT) (driving wheel torque calculator). According to the embodiment, the control logic in FIG. 3 shows the method of using the known proportional integral (PI) control or proportional integral and derivative (PID) control to calculate the wheel torque correction amount (ΔWDT) during idling that causes the accelerator operation amount to be 0.

The method provides revolution speed feedback operation means for performing a feedback operation for the wheel torque (WDT) based on a speed deviation between the engine speed (NE) and the target revolution speed. The purpose is to make approximate correspondence between the actual engine speed (NE) and the target revolution speed during idling. The actual engine speed (NE) is calculated by measuring a time interval for NE signal pulses received from the crank angle sensor 2. During idling that causes the accelerator operation amount to be 0, the wheel torque (WDT) is corrected by adding the wheel torque correction amount (ΔWDT) to the wheel torque (WDT).

The target revolution speed may be configured so as to provide an engine idle speed approximately 100 through 200 rpm higher than a specified value. One purpose is to accelerate warm-up of the engine 6 at engine starting when the cooling water temperature (THW) is smaller than or equal to a specified value. Another purpose is to ensure the capability of the air conditioning system even during traffic congestion. Still another purpose is to prevent engine stall due to an operation of electric equipment such as headlamps while operating engine accessories such as a pump and an alternator rotationally driven by the crankshaft 7 of the engine 6.

The ECU 15 reads the current gear position from the TCM. The ECU 15 reads the transmission gear ratio (gear ratio), one of the vehicle specifications, from the memory such as EEPROM or standby RAM to calculate the transmission gear ratio (gear ratio) corresponding to the current gear position. The ECU 15 divides the calculated wheel torque (WDT) by the transmission gear ratio (gear ratio) to calculate the driver-requested engine output shaft torque (i.e., driver-requested torque) (transmission output shaft torque calculator). The ECU 15 controls the quantity of fuel injected into the combustion chamber of each cylinder for engine 6 based on the calculated engine output shaft torque (i.e., driver-requested torque). In this manner, the engine speed and the engine output shaft torque can comply with target parameters (target speed and target acceleration) corresponding to the accelerator operation amount.

When a driver drives the vehicle at a constant speed, the system calculates a driver-requested torque compliant with the target speed corresponding to the driver's accelerator operation amount. Based on the calculated driver-requested torque, the system provides control so that the injection quantity becomes optimal. The driver can safely realize constant running by offering good fuel economy without repeatedly pressing and releasing the accelerator pedal to annoy passengers.

When the driver drives the vehicle at a specified acceleration in accelerated/decelerated mode, the system calculates a driver-requested torque compliant with the target acceleration corresponding to changes in the driver's accelerator operation amount. Based on the calculated driver-requested torque, the system provides control so that the injection quantity becomes optimal. The driver can realize smooth acceleration and deceleration even when pressing the accelerator pedal for acceleration and releasing the accelerator pedal for deceleration.

Accordingly, vehicle's running states can exhibit response and smoothness in compliance with the driver's intention. It is possible to realize constant running or accelerated/decelerated running based on specified target acceleration according to driver requests, i.e., according to a given target speed corresponding to a driver-requested accelerator operation amount. Consequently, the drivability can be improved.

As mentioned above, one vehicle may be remodeled into another in compliance with diverse specifications by variously modifying the vehicle specifications that affect increase of decrease of the vehicle's running resistance. The common rail fuel injection system according to the embodiment can rewrite the storage contents of memory such as EEPROM or standby RAM to reconfigure constants based on the vehicle specifications such as vehicle weight, air density, frontal projected area, running resistance coefficient, road frictional resistance coefficient, gear ratio, and tire radius. Simply doing so can easily modify the control program (see FIG. 2) and the control logics (see FIGS. 3 and 4) when modifying the vehicle specifications causes changes in the running resistance (RR=FD+FR, RR=FD+FR+FA), the wheel torque, and the driver-requested engine output shaft torque (i.e., driver-requested torque). This enables one-to-one correspondence between a physical feature such as the vehicle specifications and the control logic or the control program. It is possible to easily and appropriately provide compliance between intended parameters (driver's accelerator operation amount, target running speed, and target acceleration) and the driver-requested torque.

One vehicle may be remodeled into another in compliance with diverse specifications by variously modifying the vehicle specifications that affect increase of decrease of the vehicle's running resistance. Nonetheless, it is possible to easily and accurately perform a compliance operation corresponding to the above-mentioned specification modification without increasing the number of compliance steps so as not to change the correspondence between a driver's output request (a pedaling degree of an accelerator pedal) and the vehicle's running condition (acceleration feel).

The driver may change the accelerator operation amount for accelerated/decelerated running of the vehicle based on a target acceleration. In such a case, it is possible to decrease the number of compliance steps for drivability (accelerating/decelerating driving performance) in accordance with a change in the accelerator operation amount caused by the driver. The driver may not change the accelerator operation amount for constant running of the vehicle at a given target speed. In such a case, it is possible to decrease the number of compliance steps for drivability (constant running feel) in accordance with the accelerator operation amount generated by the driver. Correcting the target speed at a specified correcting ratio makes it possible to set the target speed capable of following from the current running speed (vehicle speed) to the next time. The accuracy to calculate the air resistance can be improved during transient running of the vehicle on flat roads.

According to the embodiment described above, the engine controller is applied to the common rail fuel injection system (diesel engine control system). The engine controller of the present invention may be applied to such a fuel injection system for internal combustion engines as does not have the common rail 11 and pressure-feeds high-pressure fuel directly to a fuel injection valve or a fuel injection nozzle from a fuel supply pump via high-pressure supply pipe. The present invention may be applied to an engine controller (engine control system) that controls an intake airflow directed into a cylinder of a vehicle-mounted engine in accordance with a driver's accelerator operation amount.

The embodiment uses the memory such as EEPROM or standby RAM as the vehicle specifications storage device for storing constants based on the vehicle specifications and reconfigured by the vehicle specifications administrator. It may be preferable to use other storage media such as nonvolatile memory including EPROM and flash memory, DVD-ROM, CD-ROM, and flexible disk for storing constants based on the vehicle specifications and reconfigured by the vehicle specifications administrator. In this case also, the stored contents are reserved after the ignition switch is turned off (IG OFF) and a specified time period elapses or after the engine 6 stops operating.

The vehicle equipped with a navigation system may use the following vehicle specifications administrator to reconfigure the constants based on the vehicle specifications. A monitor to display maps is configured to display information about optional parts of the vehicle. An operation switch or the like is used to select an optional part newly installed on the vehicle. The selected information is transmitted to the ECU 15. Further, the gear position sensor may use means for detecting operation positions of the driver's shift lever or selection lever.

The embodiment uses the vehicle weight (m or W) as a constant based on the vehicle weight belonging to the vehicle specifications. It may be preferable to use the vehicle weight (m or W) multiplied by a correction coefficient as a constant based on the vehicle weight belonging to the vehicle specifications. The embodiment uses the effective tire radius (tire radius: r) as a constant based on the effective tire radius belonging to the vehicle specifications. It may be preferable to use the tire radius (tire radius: r) multiplied by a correction coefficient as a constant based on the effective tire radius belonging to the vehicle specifications. The embodiment uses the final gear ratio as a constant based on the final gear ratio belonging to the vehicle specifications. It may be preferable to use multiplication between a correction coefficient and a result from mutual multiplication of gear ratios for a plurality of transmission sections such as a transmission and differential gears, as a constant based on the final gear ratio belonging to the vehicle specifications. The embodiment uses the running resistance coefficient (air resistance coefficient, air drag coefficient, or CD value: Cd) as a constant based on the air resistance coefficient belonging to the vehicle specifications. It may be preferable to use the running resistance coefficient (air resistance coefficient, air drag coefficient, or CD value: Cd) multiplied by a correction coefficient as a constant based on the air resistance coefficient belonging to the vehicle specifications. The embodiment uses the frontal projected area (S) as a constant based on the frontal projected area belonging to the vehicle specifications. It may be preferable to use the frontal projected area (S) multiplied by a correction coefficient as a constant based on the frontal projected area belonging to the vehicle specifications.

Therefore, it should be appreciated that the object of the present invention is to easily and appropriately provide compliance between intended parameters (driver's accelerator operation amount, target running speed, and target acceleration) and an engine output shaft torque equivalent to a driver-requested torque. The best mode for carrying out the invention achieves this object by making one-to-one correspondence between a physical feature such as vehicle specifications and a control logic or a control program.

What is claimed is:

1. An engine controller to control an injection quantity or intake airflow supplied to a cylinder of an engine mounted on a vehicle correspondingly to a driver's accelerator operation amount, comprising:

a vehicle specifications administrator capable of reconfiguring one or more constants based on vehicle specifications such as a vehicle weight, an effective tire radius, or a final gear ratio when a change is made to the vehicle specifications associated with an increase or a decrease in a running resistance of the vehicle;

a target acceleration calculator for determining target acceleration from the driver's accelerator operation amount and an acceleration resistance calculator for determining an acceleration resistance using the target acceleration and a constant based on the vehicle weight;

a running resistance calculator for adding at least an air resistance and a rolling resistance to the acceleration resistance to determine a running resistance for running the vehicle at the target acceleration;

a driving wheel torque calculator for determining a driving wheel torque using the running resistance and a constant based on the effective tire radius; and a transmission output shaft torque calculator for determining an engine output shaft torque equivalent to a driver-requested torque using the driving wheel torque and a constant based on the final gear ratio.

2. The engine controller according to claim 1, wherein the target acceleration calculator determines a target running speed from the accelerator operation amount and time-differentiates the determined target running speed to determine target acceleration.

3. The engine controller according to claim 1, wherein the acceleration resistance calculator multiplies the target acceleration by the constant based on the vehicle weight to determine an acceleration resistance.

4. The engine controller according to claim 1, wherein when a change is made to the vehicle specifications associated with an increase or a decrease in the vehicle's running resistance, the vehicle specifications administrator is capable of reconfiguring a constant based on a vehicle weight belonging to the vehicle specifications; and the running resistance calculator has rolling resistance calculator for determining the rolling resistance using the constant based on the vehicle weight.

5. The engine controller according to claim 4, wherein the rolling resistance calculator determines a rolling resistance by multiplying the constant based on the vehicle weight by a road frictional coefficient and gravitational acceleration.

6. The engine controller according to claim 1, wherein the driving wheel torque calculator determines the driving wheel torque by multiplying the running resistance by the constant based on the effective tire radius.

7. The engine controller according to claim 1, wherein the driving wheel torque calculator determines the driving wheel torque in consideration for a feedback correction amount corresponding to a deviation between an engine speed and a target revolution speed during idling.

8. The engine controller according to claim 1, wherein the transmission output shaft torque calculator determines the engine output shaft torque by dividing the driving wheel torque by the constant based on the final gear ratio.

9. The engine controller according to claim 1, wherein the engine controller has a storage device for storing relationships between the engine output shaft torque and the injection quantity or the intake airflow supplied to the engine's cylinder based on map data or calculation formula data; and the engine output shaft torque to be calculated by the transmission output shaft torque calculator is converted into the injection quantity or the intake airflow based on the map data or the calculation formula data stored in the storage device.

10. The engine controller according to claim 1, further comprising a diesel engine control system which controls an injection quantity to be injected into a cylinder of a diesel engine mounted on the vehicle, a fuel injection timing, or a fuel injection pressure based on an engine output shaft torque equivalent to the driver-requested torque.

11. An engine controller to control an injection quantity injected into a cylinder of an engine mounted on a vehicle or an intake airflow supplied to a cylinder of an engine corresponding to an accelerator operation amount, comprising:

a vehicle specifications administrator capable of reconfiguring one or more constants based on vehicle specifications such as an air resistance coefficient determined by the vehicle's overall shape, the vehicle's frontal projected area, an effective tire radius, or a final gear ratio when a change is made to the vehicle specifications associated with an increase or a decrease in a running resistance of the vehicle;

a target speed calculator for determining a target running speed from the driver's accelerator operation amount and air resistance calculator for determining an air resistance using the target running speed, a constant based on the air resistance coefficient, and a constant based on the frontal projected area;

a running resistance calculator for adding at least a rolling resistance to the air resistance to determine a running resistance for constant running of the vehicle at the target running speed;

a driving wheel torque calculator for determining a driving wheel torque using the running resistance and a constant based on the effective tire radius; and a transmission output shaft torque calculator for determining an engine output shaft torque equivalent to a driver-requested torque using the driving wheel torque and a constant based on the final gear ratio.

12. The engine controller according to claim 11, wherein the air resistance calculator determines an air resistance by squaring the target running speed and multiplying a result by the constant based on the air resistance coefficient, the constant based on the frontal projected area, and an air density.

13. The engine controller according to claim 11, wherein the air resistance calculator has a target speed corrector that corrects the target running speed at a specified correcting ratio.

14. A method of controlling an injection quantity or intake airflow supplied to a cylinder of an engine mounted on a vehicle, comprising:

reconfiguring one or more constants associated with an increase or a decrease in a running resistance of the vehicle, the constants being based on vehicle specifications;

determining a target acceleration from an accelerator operation amount;

determining an acceleration resistance based on the target acceleration and a constant related to the vehicle weight;

adding at least an air resistance and a rolling resistance to the acceleration resistance to determine a running resistance for running of the vehicle at the target acceleration;

determining a driving wheel torque based on the running resistance and a constant related to the effective tire radius; and determining an engine output shaft torque equivalent to a driver-requested torque based on the driving wheel torque and a constant related to the final gear ratio.

* * * * *